No. 829,401. PATENTED AUG. 28, 1906.
W. HIPKINS.
LAND MARKER.
APPLICATION FILED JUNE 25, 1906.
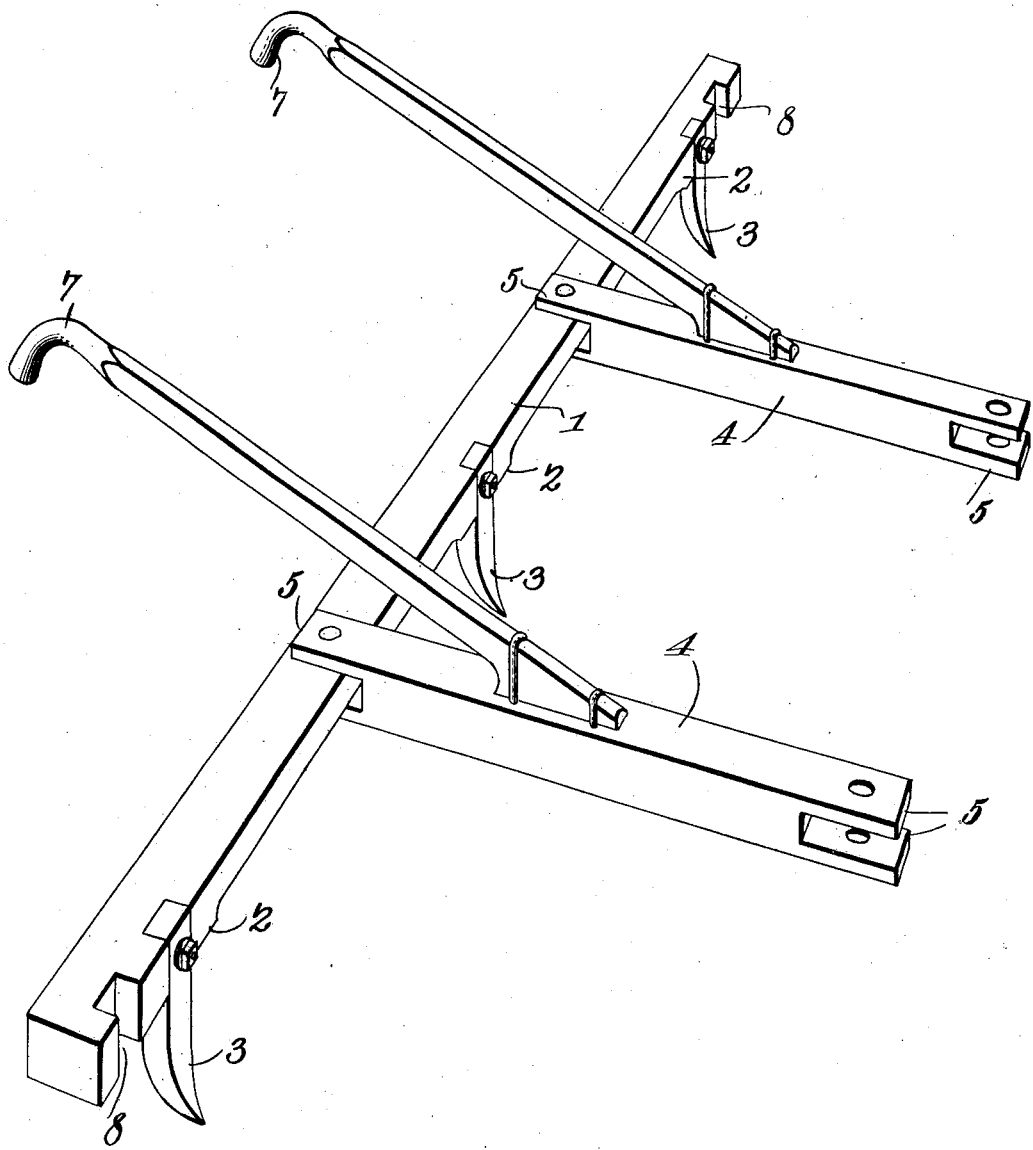
WITNESSES:
*William Hipkins,*
INVENTOR
By *C. A. Snow & Co.*
ATTORNEYS

UNITED STATES PATENT OFFICE.

WILLIAM HIPKINS, OF STREET, MARYLAND.

LAND-MARKER.

No. 829,401. Specification of Letters Patent. Patented Aug. 28, 1906.

Application filed June 25, 1906. Serial No. 323,356.

*To all whom it may concern:*

Be it known that I, WILLIAM HIPKINS, a citizen of the United States, residing at Street, in the county of Harford and State of Maryland, have invented a new and useful Land-Marker, of which the following is a specification.

This invention has relation to land-markers; and it consists in the novel construction and arrangement of its parts as hereinafter shown and described.

The object of the invention is to provide a land-marker in the form of an attachment which is adapted to be easily and readily applied to or detached from a planter or other agricultural implement and which consists primarily of a bar carrying a plurality of marking-points, said bar being thickened vertically at its portions where attachment is made with the marking-points for the purpose of adding rigidity both to the bar and points. Parallel arms are pivoted at their rear ends to the said bar at points between the marking-points. Said arms are provided with handles. The forward ends of the said arms are adapted to be pivotally attached to the rear portion of the frame of the agricultural implement. (Not shown.) The pivotal connection between the implement-frame, the arms, and the bars are such that the parts may move in lateral relation only and are retained in the same relative horizontal planes.

In the drawing the figure is a perspective view of the land-marker.

The marker attachment consists of the bar 1, which is thickest vertically at the portions 2 2. The marking-plows 3 3 are attached at their upper ends to the bar 1 at the portions 2 2 thereof. By this means rigidity is given both the bar and the marking-plows.

The ends of the arms 4 4 are provided with the horizontally-disposed bifurcations 5 5. The bifurcations at the rear ends of the said arms receive a part of the agricultural implement (not shown) and are pivotally attached thereto. The arms 4 4 are parallel to each other and may swing in lateral directions, but are retained against vertical swing or movement. The bar 1 may move laterally, but is retained vertically with relation to the arms 4 4. The guiding-handles 7 7 are attached to the arms 4 4.

The forward vertical sides of the ends of the bar 1 are recessed, as at 8 8, and the upper ends of the markers 3 are adapted to fit snugly within said recesses. It is obvious that as the agricultural implement (not shown) passes over the ground that the attached marker trailing in its wake will mark the surface of the ground. The bar 1 may be shifted laterally to preserve accuracy in the lines being marked or to escape obstructions upon the surface of the ground.

Having described my invention, what I claim as new, and desire to secure by Letters Patent, is—

1. A land-marker, consisting of an attachment adapted to be applied to or detached from an agricultural implement, consisting of a bar carrying a plurality of marking-points, arms pivotally attached at their ends at equal distances apart to the bar and implement-frame and guiding-handles carried by the attachment.

2. A land-marker consisting of an attachment adapted to be applied to or detached from an agricultural implement, consisting of a bar carrying a plurality of marking-points, arms pivotally attached at their ends at equal distances apart to the bar and implement-frame, said arms and bar being susceptible of lateral movement but retained against vertical movement with relation to the implement-frame.

3. A land-marker consisting of an attachment adapted to be applied to or detached from an agricultural implement, consisting of a bar carrying a plurality of marking-points, arms pivotally attached at their ends at equal distances apart to the bar and implement-frame, guiding-handles carried by the attachment, and means for adjusting the position of the marking-points.

4. A land-marker consisting of an attachment adapted to be applied to or detached from an agricultural implement, consisting of a bar carrying a plurality of marking-points, said bar being thickest vertically at the portions thereof where attachment is made with said points, arms pivoted at their rear ends to the bar at points between the marking-points, and pivotally connected at their forward ends to the implement-frame.

5. A marker consisting of an attachment adapted to be applied to or detached from an agricultural implement, a bar, marking-points attached thereto, the point at the middle of the bar being fixed, the end points being adjustable, arms pivoted at their rear ends to the bar at points between the marking-points and adapted to be pivotally connected at their forward ends to the implement.

In testimony that I claim the foregoing as my own I have hereto affixed my signature in the presence of two witnesses.

WILLIAM HIPKINS.

Witnesses:
    LURA M. STEARNS,
    HOWARD RIGDON.